United States Patent [19]
Rossitto

[11] Patent Number: 5,977,283
[45] Date of Patent: Nov. 2, 1999

[54] THERMOSETTING ADHESIVE AND METHOD OF MAKING SAME

[75] Inventor: Conrad Rossitto, Bradford, Mass.

[73] Assignee: Lear Corporation, Southfield, Mich.

[21] Appl. No.: 08/841,279

[22] Filed: Apr. 29, 1997

Related U.S. Application Data

[60] Provisional application No. 60/023,480, Aug. 12, 1996.

[51] Int. Cl.⁶ ............................. C08G 18/28; C08G 18/81
[52] U.S. Cl. ........................... 528/44; 524/589; 524/590; 528/60; 528/65; 528/66; 528/73; 528/80; 528/81; 528/83; 528/84; 528/85
[58] Field of Search ............................ 428/355 N, 423.1; 524/589, 590; 528/44, 59, 60, 65, 66, 73, 80, 81, 83, 84, 85

[56] References Cited

U.S. PATENT DOCUMENTS 5,155,180  10/1992  Takada et al. ........................... 525/440

OTHER PUBLICATIONS

Nov. 17, 1997, PCT Search Report.

*Primary Examiner*—Jenna Davis
*Attorney, Agent, or Firm*—Brooks & Kushman P.C.

[57] ABSTRACT

The present invention provides a low softening temperature, fast-setting adhesive package that exhibits high ultimate temperature performance. These adhesives are particularly useful in the manufacture of bonded furnishings which may require the creation of a bond at a relatively low temperature but maintenance of the bond at relatively high temperatures. A preferred adhesive of the present invention comprises a partially reacted blend of an aliphatic polyester and a trifunctional isocyanate. After curing, the adhesive forms an adhesive composition that exhibits high temperature performance.

15 Claims, No Drawings

5,977,283

THERMOSETTING ADHESIVE AND METHOD OF MAKING SAME

This application claims benefit of Provisional application Ser. No. 60/023,480 filed Aug. 12, 1996.

TECHNICAL FIELD

The present invention pertains to curable film adhesives useful in manufacturing upholstered automotive seating and other components. More particularly, the present invention pertains to dual function adhesives having a low thermoplastic application temperature followed by a cure which provides a substantially thermoset product. The dual function adhesives can form non-blocking films, and are prepared by the blending and at least partial reaction of an isocyanate reactive component with a large stoichiometric excess of polyfunctional isocyanate.

BACKGROUND ART

The manufacture of various articles e.g., chairs, backrests, cushions, and seats, frequently involves the use of adhesives to join or bond different materials to one another. Adhesives are selected based upon manufacturing and material processing limitations, as well as end product performance requirements. Accordingly, adhesive packages are derived from many different chemical families. U.S. Pat. No. 5,259,656, for example, discloses a hot melt film adhesive which is a high molecular weight polyalkylene adipate polyester that is stated to be useful in a thermoplastic adhesive applications. Additionally, U.S. Pat. No. 5,068,143 discloses the production and use of thermoformable materials composed of a thermoplastic polyesterurethane, as described in greater detail hereafter.

Seat manufacturing in the transportation sector typically includes the attachment of a trim cover to a seat cushion, the trim cover providing a decorative effect. Synthetic materials like vinyl, natural materials such as leather, and fabrics that are knitted or woven represent common trim cover materials. Seat cushions are normally composed of polyurethane foam or elastomeric fibers.

Various production manufacturing methods are used to attach trim covers to seat cushions. Economics and expertise usually drive the selection of the best available option. U.S. Pat. No. 4,692,199, assigned to Lear Corporation, discloses a manufacturing process that uses a steam-based system to attach a trim cover to a seat cushion, notably an automotive seat cushion. In the process disclosed in the '199 patent, a thermoplastic adhesive is disposed between a trim cover and a seat cushion. This assembly is then heated by superheated steam to the softening temperature of the adhesive (i.e., above 95° C. (200° F.)) which enables the wetting of both trim and cushion materials by adhesive. Subsequently, the assembly is cooled below the softening temperature of the adhesive which causes the adhesive to solidify, creating a durable attachment or bond between the trim cover and the seat cushion. Thermoplastic adhesives such as those disclosed in U.S. Pat. No. 4,692,199 require a relatively high temperature to be maintained for an appreciable period for the adhesive to soften and wet the substrates to be bonded.

A thermoplastic adhesive of the thermoplastic polyurethane (TPU) type is illustrated by U.S. Pat. No. 5,068,143, where a high molecular weight polyester diol with a molecular weight in the range of 1200–10,000 Da (Daltons) is reacted with a diisocyanate at an isocyanate index of from 75 to 110, preferably 90. The thermoplastic polyesterurethane may be cast as a soft film and after heating, provides increased open times which are useful during shoe manufacturing. The long open time of the hot-melt adhesive before the polymer crystallizes eliminates multiple reheating. However, high temperature film strength is inadequate for many applications.

Thermoset adhesives have also been used for trim cover applications. The viscosity of many thermosetting polymer systems is low, and therefore penetration, wetting and adhesion to a foam substrate and trim cover or other substrates are, in general, not problematic. However, thermoset systems are generally slow to cure, and thus fabrication time is sharply increased. Increasing catalyst levels in one and two component adhesives can decrease cure time. However, ultimate physical properties of the adhesive are often compromised. Moreover, unless the catalyst is of the latent type, pot life of the adhesive will be shortened dramatically. Many types of thermosetting adhesives cannot be supplied in the form of films.

Each of these known adhesive systems and/or their application present process limitations making desirable the need for an improved adhesive package.

SUMMARY OF THE INVENTION

It has now been unexpectedly discovered that superior adhesives which are eminently suitable for use in vehicular upholstering and other applications, may be prepared by blending and at least partially reacting an isocyanate-reactive component containing a substantial amount of isocyanate-reactive solids, with a considerable stoichiometric excess of polyisocyanate to form a curable but initially thermoplastic adhesive containing isocyanate-terminated, branched, adhesive prepolymers. The subject invention adhesives can be initially applied to substrates to be bonded at relatively low temperatures and cool to form an essentially thermoplastic bond, which upon further cure in the presence of atmospheric moisture results in a thermoset structure having a high melting point and excellent adhesive properties. The adhesives of the subject invention allow the manufacture of adhesively-bonded items at low temperatures, thus avoiding damage to sensitive materials, while requiring only low to moderate energy usage. The bond may be reheated several times, if necessary, prior to final cure, yet the ultimate strength properties after curing are excellent, particularly at elevated temperatures.

DETAILED DESCRIPTION OF THE INVENTION

The present invention features a low activation temperature, fast setting adhesive package that cures to provide high ultimate temperature performance. To apply the adhesive package, one must expose the package to temperatures in excess of about 65° C. (150° F.); preferably between about 65° C. (150° F.) and 82° C. (180° F.); most preferably between about 65° C. (150° F.) and 77° C. (170° F.). By "activation" is meant developing adhesive character. At the low temperatures at which activation occurs, behavior is essentially thermoplastic, and little if any chemical reaction has taken place. After substantially curing, the adhesive package is stable above about 100° C. (212° F.); typically between about 110° C. (230° F.) and 150° C. (302° F.), and optionally higher. By "curing" is meant polymer chain extension and/or cross-linking to form a thermoset structure.

The uncured adhesive of the present invention is comprised of an at least partially reacted mixture of an isocyanate-reactive polymer or co-polymer (component A) and a poly-functional isocyanate (component B), the latter in substantial stoichiometric excess. In a preferred embodiment, the subject invention pertains to a thermoplastic/thermoset adhesive which displays hot melt adhesive properties upon initial application and develops enhanced physical properties through moisture cure, the adhesive composed of an at least partially reacted blend of one or more isocyanate-reactive component(s) having an average molecular weight of about 4000 Da to about 30,000 Da and an average functionality of at least 2, with an isocyanate component containing one or more organic polyisocyanates or mixtures thereof with one or more diisocyanates, the isocyanate component(s) having an average functionality of from about 2.0 to preferably about 2.4 or more, the blend having a branch number of 1.5 or more, blended at an isocyanate index of from about 150 to about 1500. Molecular weights in Daltons (Da) are number average molecular weights unless specified otherwise.

In a further embodiment, the invention pertains to a moisture curable, thermoplastic, non-blocking film adhesive containing unreacted isocyanate groups, containing an at least partial reaction product of a crystalline isocyanate-reactive component having a crystalline melt temperature of from about 38° C. to about 65° C., with an isocyanate component having an average functionality of at least 2.0 and preferably about 2.4 or more at an isocyanate index of from about 150 to about 1500.

The uncured adhesives of the present invention comprise branched, isocyanate-terminated products. Isocyanate-termination is assured by employing a considerable stoichiometric excess of isocyanate groups over isocyanate-reactive groups. Branching is assured by employing a branched isocyanate-reactive component, and/or a polyfunctional isocyanate. Essentially di-functional, isocyanate-terminated prepolymers prepared by the reaction of a diisocyanate with a diol, e.g. a polytetramethylene ether glycol or polyester diol are not suitable, as further reaction of the isocyanate functionality will result only in chain extension, with little or no cross-linking even at high isocyanate indexes. Under these conditions, the "cured" product is still a thermoplastic. The high temperature physical properties will therefore not be achieved.

Preferred adhesives of the subject invention are prepared by reaction of a difunctional, isocyanate-reactive polymer with a high functionality isocyanate, preferably an isocyanate with a functionality of about 2.4 or more, most preferably 3 or more. By the term "polyisocyanate" is meant an isocyanate or blend of isocyanates having an average functionality greater than 2.0. Blends of isocyanates, including blends of two and three functional isocyanates are useful. Alternatively, the subject adhesives may be prepared by reacting a higher functionality isocyanate-reactive component with a diisocyanate. Mixtures of two- and higher-functional, isocyanate-reactive species may be used. Preferably, the nature of the reactive species is such that the initial reaction product, i.e. adhesive prepolymer, may be extruded or cast into a thin, non-blocking film onto a release film. As those skilled in the adhesive art are aware, a non-blocking film is one which has a relatively low level of tack such that a roll of adhesive coated onto release paper on one side may be unrolled and the adhesive separated from the release paper or film without substantial damage. Preferably, the tack is such that the adhesive film may be supplied in roll form without release paper or film.

The isocyanate-reactive polymers preferred for use in the subject invention are polymers of relatively high molecular weight which demonstrate significant crystalline properties. Without wishing to be bound by any particular theory, it is believed that the crystalline nature of the isocyanate-reactive component minimizes open time through rapid recrystallization following softening, and is also responsible for the ability to form non-blocking films.

Preferred isocyanate-reactive functionality are amino- and hydroxyl-groups, although other isocyanate-reactive functionality, i.e., thiols, amides, or other groups may be used as well. Preferred isocyanate-reactive compounds include hydroxyl-terminated polyesters such as polyethyleneadipates, polybutyleneadipates, polycyclohexanedimethyleneadipates, polyethylenesebacates, polyethyleneterephthalates, polybutylenenaphthalates, polycaprolactone diols, etc., and polyoxyalkylene polyethers, e.g. crystallizable polyoxyethylene glycols, polyoxytetramethylene glycols, etc. When difunctional isocyanates are contemplated, tri- and higher functional polyesters and polyoxyalkylene polyols are required. Higher functionality polyesters may be prepared by adding a minor portion of a trifunctional or higher functional carboxylic acid or its equivalent, and/or by a minor portion of a trifunctional or higher functional polyol, e.g. glycerine, trimethylolpropane, pentaerythritol, or the like during esterification. Higher functionality polyoxyethylene polyethers may be prepared by using tri- or higher-functionality initiator molecules.

The isocyanate-reactive component may also be a hydroxyl, amino, or other isocyanate-reactive group-terminated polyurethane prepared from a low molecular weight, preferably symmetric diisocyanate, and a relatively low molecular weight polyol. Preferred isocyanates, e.g., are 1,4-phenylene diisocyanate, 4,4'-methylenediphenylene diisocyanate, and the like. Isocyanates such as toluene diisocyanate and isophorone diisocyanate may be used as well, however the crystalline nature of the product may decrease. Preferred polyols are ethylene glycol, 1,4-butanediol, 1,6-hexanediol, and the like. Propylene glycol, dipropylene glycol, and other low molecular weight polyols may be used. The molecular weight of the polyol component should advantageously be less than about 300 Da. Hydroxyl-functional polyurethanes are prepared by employing a stoichiometric excess of polyol. Amino-terminated polyurethanes may be produced by employing an excess of isocyanate and carefully hydrolyzing the isocyanate groups to amino groups.

Suitable amino-terminated isocyanate-reactive components include, in particular, amino-functionalized polyesters, amino-terminated polyamides, and solid amino-terminated polyoxyalkylene polyethers. The preparation of such components is well known to those skilled in the art and many such products are believed commercially available.

The isocyanate-reactive component and isocyanate component are blended at an index of about 150 to 1500 or more, preferably 150 to 1000, and more preferably 250 to 900. The isocyanate component may be reacted with the isocyanate-reactive component with or without catalysts. Suitable catalysts are those which promote the reaction of the isocyanate group with the isocyanate-reactive group. However, although catalysts which promote the reaction of isocyanate groups with themselves, i.e. isocyanurate-promoting catalysts may be included, their use is preferably avoided. It is preferable that the initial blending of the isocyanate and isocyanate-reactive component take place in the absence of a catalyst such that only minor reaction of these components occurs during adhesive preparation.

Polymers or co-polymers (component A) in accordance with the present invention preferably have a relatively high molecular weight, for example a molecular weight of at least about 8,000 Da (Daltons); preferably between about 8,000 Da and 30,000 Da; more preferably between about 8,000 Da and 15,000 Da. The molecular weight of a polymer or co-polymer disclosed herein can be determined by methods well known in the art such as GPC (gel permeation chromatography) or end-group analysis. These polymers can be further characterized as preferably exhibiting a crystalline melt point of between about 38° C. (100° F.) and 65° C. (150° F.), more preferably between about 50° C. (120° F.) and 65° C. (150° F.), and most preferably between about 60° C. (140° F.) and 65° C. (150° F.).

Such materials can be synthesized by well-known methods or purchased from commercial suppliers (e.g., Bayer, Goodrich, Ruco Corporation, Witco, Union Carbide, Shell Corporation, Schenectady Chemicals, or Bostik, Incorporated).

Most preferably, the low temperature melting crystalline polymer is a polyester; more preferably an aliphatic or cycloaliphatic polyester or a co-polymer thereof. In a most preferred embodiment of the present invention, the aliphatic polyester is a polybutylene adipate. Preferred polybutyleneadipates are characterized by an acid number from less than 1 to about 5, e.g., between about 0.5 and 5, and a hydroxyl number of between about 3 and 13. Particularly preferred polyesters of the present invention are linear aliphatic polyesters such as polybutyleneadipate, polyhexylene-adipate, polyethyleneadipate, polyethylenesebacate, polybutylenesebacate, and polycaprolactone. Aliphatic copolyesters such as poly(butylene/ethylene)—adipate and poly(cyclohexanedimethylene/butylene)adipate) are embraced within the scope of the present invention.

Preparation of the isocyanate-reactive components is well known. For hydroxyl-functional polyesters, one method of manufacture is described in U.S. Pat. No. 5,250,656. In this process, adipate polyesters are prepared by the polymerization of adipic acid and one or more diols in the presence of a stoichiometric excess of diol relative to the acid. The closer the excess of diol is to stoichiometry, the higher the polyester diol product molecular weight. Typical catalysts for the polyesterification include conventional esterification catalysts such as alkyl titanates and vanadates. Preferably, the diol/acid molar ratio is in the range of about 1.001 to 1.03; more preferably the molar ratio is about 1.01. Using this technique, it is possible to produce hydroxyl-functional adipate polyesters having molecular weights between about 8,000 and 60,000 Da. The same techniques may be used for other polyesters as well.

The preferred, low melt temperature, crystalline polymer or co-polymer (component A) is an aliphatic or cycloaliphatic polyester that is derived from the reaction of one or more polycarboxcylic acids and one or more polyhydric alcohols. Polycarboxylic acids in accordance with the present invention include di- and tri-functional acids such as oxalic acid, malonic acid, succinic acid, adipic acid, glutaric acid, suberic acid, pimelic acid, azelic acid, sebacic acid, phthalic acid, isophthalic acid, terephthalic acid, trimellitic anhydride, 1,4-cyclohexane dicarboxcylic acid, hexahydrophathalic anhydride, and mixtures thereof. Preferred polyhydric alcohols possess an even carbon number. Polyhydric alcohols in accordance with the present invention include diols and triols such as 1,4-butane-diol, 1,6-hexanediol, ethylene glycol, 1,4-cyclohexane-diol, trimethylolpropane, cyclohexanedimethanol, glycerin, and mixtures thereof.

The preferred polymers and/or co-polymers for use as component A require the use of an appropriate polyhydric alcohol to polycarboxylic acid molar ratio to assure high molecular weight. Generally, the polyhydric alcohol will be in minute stoichiometric excess with respect to the polycarboxcylic acid. For example, when a diol and an aliphatic dicarboxcylic acid are selected, the acid to diol molar ratio will typically be between about 1:1.001 and 1:1.10. One or more esterification catalysts such as alkyl titantate, vanadate, or an organo-tin compound can be added to the reaction in accordance with standard methods to increase the rate of polymer or co-polymer formation. It is apparent that di-functional polycarboxcylic acids and polyhydric alcohols can be used to form linearly repeating, low melting crystalline polymers and co-polymers. Further, tri-functional polycarboxcylic acids and polyhydric alcohols, or mixtures of tri- and di-functional polycarboxcylic acids and polyhydric alcohols, can be employed in small amounts (i.e., generally between about two and five mole percent) to form branched low temperature melting crystalline polymers and co-polymers.

Polyfunctional isocyanates (component B) in accordance with the present invention are preferably those which exist in a solid form at room temperature and exhibit suitable storage stability for periods longer than six months at about 25° C. (77° F.). Further, it is preferred that the excess polyfunctional isocyanate will not substantially cure in an adhesive of the present invention for at least about six hours in the presence of atmospheric moisture at a temperature about room temperature (i.e., 25° C. (77° F.)). The choice of a solid isocyanate is particularly expedient at high isocyanate indices as a film may still be prepared.

The choice of isocyanate is partially dependent upon the functionality of the isocyanate-reactive component. For example, with isocyanate-reactive components with average functionalities in the range of 2.0 to 2.2, it is preferable to employ an isocyanate or isocyanate blend of high average functionality, i.e. 2.8 or higher. However, if the functionality of the isocyanate-reactive component itself is high, e.g. 3 to 4, then the isocyanate advantageously has a functionality or about 2.8 or below, e.g. 2.0 to 2.8. It is necessary that a substantial number of prepolymer molecules be branched, the branches being isocyanate-terminated, or that an appreciable amount of branched isocyanate remain unreacted in the uncured adhesive. When the isocyanate-reactive component is a polyester diol or amine-terminated polyamide, it is preferred that the isocyanate be a triisocyanate.

Preferred film adhesives not only have a high isocyanate index, but have a high "branch number" as well. By term "branch number" is meant the product of the average functionality of the isocyanate-reactive component ($F_{i-r}$) less 1, with the average functionality of the isocyanate component ($F_i$) less 1, in other words, branch number=($F_{i-r}$−1) ($F_i$−1). The adhesives of the subject invention preferably have branch numbers greater than about 1.5, more preferably greater than 1.8, and most preferably about 2.0 or more.

Suitable diisocyanates include aromatic diisocyanates such as 2,4- and 2,6-toluene diisocyanate (TDI); 2,2'-, 2,4'-, and 4,4'-methylenediphenylene diisocyanate (MDI); and 1,4-phenylene diisocyanate; cycloaliphatic diisocyanates such as isophorone diisocyanate (IPDI) ; and aliphatic diisocyanates such as 1,6-diisocyanatohexane and 1,8-diisocyanatooctane. Suitable polyisocyanates include polymeric MDI having average functionalities of from 2.2 to 2.4, and in particular triisocyanates, e.g. 1,3,5-triisocyanato benzene, and triisocyanates and higher functional isocyanurates prepared by reacting di- or polyisocyanates with themselves in the presence of a trimerization (isocyanurate-promoting catalyst). Such isocyanurate triisocyanates are commercially available, for example as the isocyanurate of isophorone diisocyanate, having a nominal functionality of 3.0, available from Hüls America under the trade name Vestanat IPDI 1890/100. This isocyanate has a melting point range of from about 110° C. to 115° C.

In a preferred embodiment, a triisocyanate which will substantially cure in an adhesive of the present invention in between about six and seventy-two hours in the presence of moisture is used. By "substantially cure" is meant that 80 percent, preferably 90 percent, and more preferably, greater than 90 percent of unreacted isocyanate groups will have reacted, such that a cured adhesive having little remaining free isocyanate content is produced. For applications that require a faster curing adhesive (i.e., faster than about six hours), one can introduce a poly-functional isocyanate in solution form. Examples of such isocyanates are MONDUR CB-75 and MONDUR HC, available from Bayer.

To form the uncured adhesive package, the low melt temperature crystalline polymer or co-polymer (component A) and poly-functional isocyanate (component B) are generally combined at a suitable index as hereinbefore described, although other mole ratios can be suitably employed. A person skilled in the art will appreciate that the molar ratio of the crystalline polymer or co-polymer to poly-functional isocyanate will depend primarily upon the polymer or co-polymer and isocyanate selected. The present invention also pertains to a process for producing an uncured adhesive package of the present invention. One suitable method, for example, is the conversion of the crystalline polymer or co-polymer and polyisocyanate combination into an uncured adhesive package via a blending operation. Preferably, the conversion is achieved by melt, solution, or dry blending.

In the melt blending process, an uncured adhesive package of the present invention is manufactured by melting about 80 to 90 parts by weight of polybutylene adipate with about 10 to 20 parts by weight of solid triisocyanate. The polybutylene adipate is available from Bostik, Incorporated, under the tradename Bostik 7109. It is characterized by a molecular weight of between about 8,000 and 15,000 Da, although higher molecular weights, i.e. up to 60,000 Da may also be suitable. The preferred triisocyanate is available from Hüls America under the tradename VESTANAT IPDI 1890/100. Combined components are blended for between about five and ten minutes at temperatures between about 80° C. (175° F.) and 175° C. (347° F.). Blending should be of short duration in order to prevent substantial reaction of isocyanate groups.

An uncured adhesive package of the present invention can also be obtained via solution blending. In this currently preferred manufacturing process, the triisocyanate, the polyester, and an organic solvent solution are combined and blended. The intent is to add an adequate amount of the organic solvent solution to dissolve both the triisocyanate and polyester components. Suitable organic solvent solutions include ethyl acetate, tetrahydrofuran, acetone, toluene, methyl ethyl ketone, and mixtures thereof. For example, one may combine about 100 parts by weight of polybutylene adipate (e.g., Bostik 7109) at 40% solids dissolved in toluene/methyl ethyl ketone (MEK), with about 12.4 parts by weight triisocyanate (e.g., Hüls Vestanat IPDI 1890/100) dissolved in toluene at 60% solids. Alternately, one could combine about 100 parts by weight of polybutylene adipate with about 9.25 parts by weight of the triisocyanate. In each case, the polyester may be dissolved to the indicated solids content in a 50/50 solution of toluene/methyl ethyl ketone, and the isocyanate dissolved in toluene. Other solvents are also suitable. If high temperature mixing of solutions containing volatile solvents is contemplated, it will of course be necessary to conduct the mixing under pressure. Following blending at room temperature, the solvent may be removed in vacuo or by aid of an inert gas stream (stripping). If an adhesive solution is desired, all or a part of the solvent may remain. The solution is advantageously used to cast a film which solidifies through solvent evaporation. Prior to casting, the solution blended components are preferably "aged" for a short time to facilitate at least partial reaction of isocyanate and degassing.

"Dry blending" techniques can also be used to manufacture an uncured adhesive package of the current invention. In this process, the triisocyanate and the polyester are combined in solid, granular form in a vessel and blended. For example, an uncured adhesive package could be made by combining about 85 parts by weight polybutyleneadipate (e.g., Bostik 7109, 100% solids) with 15 parts by weight triisocyanate (e.g., Hüls Vestanat IPDI 1890/100). In the "dry blending" technique, it is preferable that the temperature remain low so that efficient mixing occurs without significant reaction. The thoroughly blended material may then be partially reacted at a later stage in the film forming process, e.g., in a film extruder. Transit time and temperature of the extruder should be minimized to prevent full reaction of the components.

Whether blended neat or in solution, the isocyanate component will react at least partially with the isocyanate-reactive component. The degree of reaction can be tailored to fit the application. For example, with a liquid isocyanate component or a mixture of liquid and solid components, the degree of reaction will be generally higher, but not to the point where all isocyanate-reactive groups have reacted. The resulting adhesive will still contain substantial unreacted isocyanate groups, and will be capable of forming a film. When the isocyanate component is solid, film formation is less problematic, and the isocyanate component may be only partially reacted. However, at very high isocyanate indexes, the integrity of the film may suffer. Thus, more complete reaction may be desired in such cases. Film formation and film integrity are both easily ascertained by casting or extruding a film onto suitable release paper, i.e. silicone-coated paper or polyolefin film, allowing the adhesive film to solidify, and forming the film/release paper composite into a roll. Following cooling, both the non-blocking characteristics and film strength can be examined merely by unrolling the roll and peeling away the release paper. A formulation which does not stick to the release paper when unrolling, which can be peeled away from the paper intact, and which can be handled to the degree necessary for manufacturing is a suitable film adhesive formulation in these respects.

The uncured adhesive is preferably converted into film or sheet form by conventional techniques. Melt blended adhesive packages can be converted into film form by conventional casting or film extrusion techniques. Additionally, solution blended uncured adhesive can be converted into film via traditional solution casting processes between about ten minutes and three hours, preferably about 30 minutes after combining the solutions. Further, dry blended uncured adhesive packages can be converted into film by conventional extrusion techniques. Of course, the physical dimensions of the film or sheet can vary to accommodate the desired application. The adhesive may also be cast onto a release coated belt or "chill plate" and following solidification and/or solvent evaporation, taken up as a roll without release paper. A Teflon-coated metal belt may be used, for example.

Preferably, the uncured adhesive package is converted into a film form; more preferably this film is at least about one mil thick; most preferably it is between about one and two mils thick. Representative uncured adhesive packages are made by each of the above detailed conversions with the following dimensions: about 20.0 inches wide by about 0.0015" to 0.0030" thick. The films may also be applied to standard release paper to allow for manipulation.

A converted uncured adhesive package of the present invention is typically stable for periods up to about six months under suitable storage conditions. Suitable storage conditions require that the uncured adhesive package is substantially protected from moisture and temperature excursions which might prematurely advance the curing of the adhesive. A preferred storage condition is where an uncured adhesive package of the present invention is stored in a substantially moisture sealed package below about 5° C. (40° F.); more preferably at or below about 0° C. (32° F.). For many systems, advancement of the adhesive may occur during storage, by further reaction of isocyanate and isocyanate-reactive component. Film strength and blocking characteristics may thus be evaluated after storage in such cases.

Uncured adhesive packages of the present invention are characterized in part as including a low melting polymer or co-polymer partially reacted with a slow reacting polyisocyanate. Two primary chemical reactions occur under normal conditions within the confines of the described adhesive package to transform the low activation temperature uncured adhesive package into a high ultimate temperature performance adhesive package. In the first reaction, a slow reacting polyisocyanate reacts via —N═C═O groups with reactive groups of the low melting temperature, preferably crystalline polymer or co-polymer, to create an adhesive pre-polymer that is poly-functional. This reaction may, as previously indicated, occur at least in part, during initial component blending It may also occur in part during storage of the film, and will occur to some degree upon use. The second reaction involves the reaction between —N═C═O groups with atmospheric moisture which effectively leads to the curing of the adhesive package.

As used herein, the term "partially reacted" means that the adhesive package has less than about thirty weight percent of the originally available isocyanate groups reacted with the reactive hydrogens or other reactive groups of the preferably crystalline polymer or co-polymer. By the term "at least partially reacted" and like terms is meant an adhesive in which isocyanate groups have reacted, but the adhesive product, after initial preparation and casting as a film, has not more than about partially reacted as that term is defined above.

The "curing reaction" involves the reaction between unreacted, excess isocyanate groups and atmospheric moisture. Reactive isocyanate groups are found in the branched adhesive pre-polymer as well as any unreacted isocyanate. As used herein, the term "atmospheric moisture" means environmental humidity in the air and/or otherwise available to a substrate. Of course, cure may also be effected, generally more rapidly, in the presence of additional moisture over and above that normally present, e.g., additional water added as excess humidity over that available in the ambient air, as a water spray, or as steam, etc.

In the presence of moisture, isocyanate groups react with water, converting the isocyanate group to an amine group with liberation of carbon dioxide. The amine groups formed are quite reactive, and possess catalytic qualities as well, and therefore rapidly react with further isocyanate to form urea linkages. Because the adhesive has, in general, a considerable excess of isocyanate groups, at least three variations of curing reactions are thought to participate in the cure of the adhesive and contribute to the high ultimate properties obtained.

In the first moisture-induced reaction, a terminal isocyanate from one polymer chain, i.e. adhesive prepolymer, reacts, with the aid of water, with a terminal isocyanate of another adhesive prepolymer chain, forming a urea linked polymer of higher, e.g. approximately double, molecular weight. This reaction may be termed "chain extension." Chain extension increases the melting point, tensile strength, and other properties due to the higher molecular weight per se, as well as by increasing the content of polar, "hard segments", i.e. urea linkages. However, the degree of property improvement by this mechanism is limited except in the case where the lowest molecular weight isocyanate reactive components are used.

The second moisture-induced reaction is interchain cross-linking, where a polymer chain of an adhesive prepolymer is linked to another adhesive prepolymer chain at a point other than merely at the chain terminus, or at the chain terminus but linked by branching at this point rather than just chain extension, possible with termini of multiple functionality. Interchain cross-linking inhibits thermally induced polymer chain movement, in other words, prevents the polymer chains from free movement at higher temperatures where a linear, non-cross-linked polymer would melt and flow. The polymer adhesive has thus become "thermoset." The degree of cross-linking determines thermoset polymer properties. At very low levels of cross-linking, the polymer may still melt, but the melt viscosity will be high. As the proportion of cross-links increases, melting is essentially prohibited. The polymer may soften, but is incapable of any substantial flow.

The third moisture-induced reaction is the formation of interpenetrating polymer networks where free polyisocyanates and/or isocyanate-terminated prepolymer molecules react in conjunction with water to form urea-linked interpenetrating, three-dimensional polymer network. Both interchain cross-linking and interpenetrating polymer networks are believed to play a major role in development of ultimate polymer strength.

The adhesives of the subject invention are unique in that they develop a degree of initial adhesive strength comparable to conventional "hot melt" adhesives. This initial adhesive strength is useful in applying trim cover, fabric, etc. to foam cushions or the like, or to initially bond other types of components. The complete manufactured article may be handled conventionally, i.e. packed for shipment, etc., and not lose the integrity of the adhesive bond. However, at this point, the adhesive has not yet developed its full adhesive properties. Full strength is developed after application to the substrates. The time taken to reach full adhesive strength depends upon numerous factors, but is primarily moisture and temperature dependent. For example, properties develop more rapidly if stored for a period under high humidity at elevated temperature, i.e. 90% relative humidity at 50° C. However, in general, this is not necessary, and it has been found, surprisingly, that the normal shipping transit time, vehicle assembly time, etc., is more than sufficient to develop excellent physical properties with no necessity to cure in a high temperature humid environment. Thus, the ultimate physical properties are comparable to or better than those produced by prior art thermoset polymer system, while offering much faster initial assembly time.

It has been discovered that exceptional increases in adhesive film strength when applied to trim materials bonded to polyurethane foam may be achieved by including a catalyst in the formulation. Typical catalysts which are suitable include but are not limited to the various tin catalysts, i.e. stannous octoate, dibutyltin dilaurate, dibutyltin diacetate, and the like, most particularly dibutyltin dilaurate, available from Air Products and Chemicals as catalyst T-12. Also suitable are the various amine catalysts, for example triethylene diamine, diethylene triamine, and the like. Blends of these catalysts may also be used. Amounts of catalyst in the range of 0.01 weight percent to about 5 weight percent, more preferably 0.1 to about 2.5 weight percent, and most preferably 0.3 to about 1.8 weight percent are effective. Catalyst T-12 at a concentration of 1.5 weight percent is particularly useful. Amine catalyst may be required to be present in higher amounts. Initial tests have shown that triethylenediamine when used as the sole catalyst, does not provide any advantage over an uncatalyzed adhesive when used in quantities of 0.5 weight percent or lower.

One well-known method of determining the physical properties of a polymer, pre-polymer, or co-polymer disclosed herein as a function of cure is to test tensile strength at a temperature or a range of temperatures of interest (e.g., about 25° C. (77° F.) to 175° C. (347° F.)). As an example, a polymer film of a known thickness can be tested for strength at a specific temperature by use of a suitable tensile strength testing device like an Instron™ tester which has mechanically controllable jaws located in a temperature controlled environment.

The catalyst may be added to the formulation at any suitable stage. In melt blended adhesive, the adhesive formulations are preferably well blended, following which the catalyst is added, optionally as a master batch in one of the formulation ingredients. Adding the catalyst following the bulk of the mixing procedure helps ensure that premature curing does not result. The blend may be cooled as much as practical to assist in achieving this result as well.

In the case of solution blended adhesives, the catalyst, when used, is preferably added at the end of the blending operation, either neat, dissolved in suitable solvent, or as a master batch dissolved or dispersed in one of the adhesive raw materials or subassemblies. Solution blending is preferred. The film adhesive, as cast, is expected to increase slightly in viscosity upon storage. However, this slight increase is acceptable provided commercially acceptable storage conditions are maintained.

Having generally described this invention, a further understanding can be obtained by reference to certain specific examples which are provided herein for purposes of illustration only and are not intended to be limiting unless otherwise specified.

EXAMPLES 1–4

The usefulness of the catalyzed adhesive may be quantified by comparison of the bond strength of an uncatalyzed adhesive prepared as described previously as a solution blended adhesive. This adhesive was cast as a film as is, i.e. uncatalyzed, and as catalyzed films containing, in weight percent, 1.5% T-12, 1.5% triethylene diamine, and 0.5% triethylene diamine. The film adhesives were used to bond trim to a conventional seating foam. The bond strengths are measured after exposure to 100° F., 90% relative humidity for one hour, and at room temperature for 24 hours. The results are presented in Table 1 below.

TABLE 1

| Example | 1 | 2 | 3 | 4 |
|---|---|---|---|---|
| Catalyst | none | 1.5% T-12 | 1.5% TEDA | 0.5% TEDA |
| Bond Strength/Failure | | | | |
| 1 hour cure @ 100° F. | 241 g/AF[1] | 497 g/FF[2] | 136 g/AF | 77 g/AF |
| 24 hour cure @ RT | 85 g/AF | 605 g/FF | 150 g/AF | 61 g/AF |

[1]Adhesive failure
[2]Foam failure

The results indicate that 1.5 weight percent T-12 tin catalyst increases bond strength significantly, to the extent that the failure mechanism is distruction (parting) of the foam. In all the remaining examples, adhesive failure constituted the failure mechanism. In Example 3, 1.5% TEDA (triethylene diamine) showed a slight decrease in properties at 100° F. cure for one hour, but a significant increase in properties when cured at room temperature (RT) for 24 hours. However, at the 0.5 level, properties appeared to decrease for both cure cycles. The amount of catalyst may be selected with the particular substrate and trim in mind. For example, with leather trim, where a modest heat treatment is applied following bonding to the foam substrate, the catalyzed adhesive appears to be the best choice. A beneficial blend of properties is expected from blends of amine and tin catalysts.

Having now fully described the invention, it will be apparent to one of ordinary skill in the art that many changes and modifications can be made thereto without departing from the spirit or scope of the invention as set forth herein.

What is claimed is:

1. A thermoplastic/thermoset adhesive which displays hot melt adhesive properties upon initial application and develops enhanced physical properties through moisture cure, said adhesive comprising:

an at least partially reacted blend of one or more isocyanate-reactive component(s) having an average molecular weight greater than 8000 Da. to about 30,000 Da, and an average functionality of at least 2, with an isocyanate component comprising one or more solid organic polyisocyanates, or mixtures thereof with one or more diisocyanates, said isocyanate component having an average functionality of 2.4 or more, said blend having a branch number of 1.5 or more, at an isocyanate index of from about 150 to about 1500.

2. The adhesive of claim 1 which is a film-forming solid at 25° C.

3. The adhesive of claim 2 which is non-blocking.

4. The adhesive of claim 1 wherein said isocyanate-reactive component(s) contain isocyanate-reactive functionality selected from the group consisting of hydroxyl functionality, amide functionality, and amino functionality.

5. The adhesive of claim 1 wherein said isocyanate-reactive component comprises a hydroxyl-terminated polyester having a crystalline melt temperature of between about 38° C. and 65° C.

6. The adhesive of claim 5 wherein said polyester is a polybutylene adipate polyester having a molecular weight greater than 8000 Da, to 30,000 Da, and wherein said branch number is 1.8 or greater.

7. The adhesive of claim 1 wherein said isocyanate component comprises a triisocyanate.

8. The adhesive of claim 6 wherein said isocyanate component comprises a triisocyanate.

9. The adhesive of claim 1 wherein said isocyanate component comprises a tri-isocyanato isocyanurate prepared by reacting an aliphatic diisocyanate cycloaliphatic diisocyanate, aromatic diisocyanate, or mixture thereof in the presence of an isocyanurate-promoting catalyst.

10. The adhesive of claim 9 wherein said cycloaliphatic diisocyanate comprises isophorone-diisocyanate.

11. The adhesive of claim 6 wherein said polyisocyanate comprises the isocyanurate trimer of isophoronediisocyanate.

12. The adhesive of claim 1 further comprising one or more urethane reaction promoting catalysts.

13. The adhesive of claim 12 wherein at least one of said catalysts is an amine catalyst, a tin catalyst, or a mixture thereof.

14. The adhesive of claim 12 wherein at least one of said catalysts is a tin catalyst.

15. The adhesive of claim 12 wherein at least one of said catalysts is dibutyltin dilaurate.

* * * * *

UNITED STATES PATENT AND TRADEMARK OFFICE
CERTIFICATE OF CORRECTION

PATENT NO : 5,977,283
DATED : November 2, 1999
INVENTOR(S) : Conrad Rossitto

It is certified that error appears in the above-identified patent and that said Letters Patent is hereby corrected as shown below:

Column 12, line 43, claim 1, "8000 Da."
should be --8000 Da,--.

Signed and Sealed this

Eighth Day of August, 2000

Attest:

Q. TODD DICKINSON

Attesting Officer

*Director of Patents and Trademarks*